United States Patent [19]

Junge et al.

[11] 4,066,818

[45] Jan. 3, 1978

[54] LEATHER DRESSING COMPOSITION OF AN AQUEOUS EMULSION OF SOLVENT SOLUTIONS OF SUBSTITUTED CELLULOSES AND POLYURETHANES

[75] Inventors: Peter Junge, Siegburg-Seligenthal; Horst Schulz, Lohmar-Heide; Rainer Schneider, Hennef; Werner Dreke, Neunkirchen-Seelscheid; Gerhard Rieger, Troisdord-Spich, all of Germany

[73] Assignee: KEPEC Chemische Fabrik GmbH, Siegburg, Germany

[21] Appl. No.: 725,003

[22] Filed: Sept. 20, 1976

[30] Foreign Application Priority Data

Sept. 25, 1975 Germany ............................ 2542767

[51] Int. Cl.[2] ........................ C08L 1/14; C08L 1/18

[52] U.S. Cl. .................................. 428/341; 260/16; 428/425; 428/904

[58] Field of Search .................. 260/16; 428/473, 540, 428/904, 425, 219, 341

[56] References Cited

U.S. PATENT DOCUMENTS

| | | | |
|---|---|---|---|
| 3,147,138 | 9/1964 | Mueller et al. | 428/473 |
| 3,475,356 | 10/1969 | Davis et al. | 260/13 |
| 3,632,417 | 1/1972 | Brasen | 428/904 |
| 3,816,168 | 6/1974 | Lewis et al. | 260/16 |
| 3,823,102 | 7/1974 | Eimer et al. | 260/16 |
| 3,943,252 | 3/1976 | Schroer et al. | 428/262 |

*Primary Examiner*—Edward M. Woodberry
*Attorney, Agent, or Firm*—Hammond & Littell

[57] ABSTRACT

A composition for dressing leather and leather substitutes comprising an aqueous emulsion of (A) an organic solvent solution of nitrocellulose or cellulose acetate butyrate and (B) an organic solvent solution of a linear polyurethane resin, in a ratio of A : B of 1 : 0.1 to 1 : 10.

12 Claims, No Drawings

LEATHER DRESSING COMPOSITION OF AN AQUEOUS EMULSION OF SOLVENT SOLUTIONS OF SUBSTITUTED CELLULOSES AND POLYURETHANES

RELATED ART

It is known that the type of dressing and the natural or synthetic products used for this purpose have a determinant influence on the quality of the leather. The object of leather dressing is to impart to the finished leather protection against external mechanical and light influences and to give it a special appearance.

Dressings based on alkali dissolved casein, which have been made water-insoluble by corresponding fixing with acids and formaldehyde, remain capable of swelling in water and have generally only moderate fastness properties.

Dressings prepared with nitrocellulose always contain a more or less large portion of plasticizers. The use of plasticizers must remain limited to avoid excessive reduction of the fastness to rubbing. The flexibility of the leather so dressed is particularly low at low temperatures and the resistance to organic solvents is limited. The plasticizer used can migrate with aging into the base coat or into the leather itself, or out of the surface, so that the dressing suffers considerably in its fastness properties, which manifests itself by breaking or peeling of the nitrocellulose lacquer film.

Another dressing system consists of nitrocellulose lacquer emulsion diluted with water. But the fastness properties obtained with organically dissolved nitrocellulose lacquers can not be achieved here.

The polyurethane systems offer decisive advantages in the dressing of leather. They have a high flexibility and very good general fastness properties. They have become known in the last years particularly under the name "easy-care dressing". The disadvantage of such a polyurethane dressing is that it feels and looks like plastic.

OBJECTS OF THE INVENTION

An object of the present invention is to develop a leather dressing which combines the good properties of the nitrocellulose dressings with those of the polyurethane systems, while eliminating as far as possible to the disadvantages of the presently known dressings.

Another object of the present invention is to develop a composition for dressing leather and leather substitutes comprising an aqueous emulsion of organic solvent solutions of (A) a substituted cellulose selected from the group consisting of nitrocellulose having a D.S. of 1.9 to 2.4, cellulose acetate butyrate having a D.S. of 2.0 to 2.8 with a ratio of acetyl to butyryl groups of 1:1 to 4:1, and mixtures thereof, and (B) a linear polyurethane resin having a molecular weight range of from 10,000 to 500,000, in a weight ratio of A:B of 1:01 to 1:10, where the weight ratio of organic solvents to water is from 6:1 to 1:1.

A further object of the present invention is the production of a leather or leather substitute dressed with the above composition.

These and other objects of the invention will become more apparent as the description thereof proceeds.

DESCRIPTION OF THE INVENTION

The invention concerns preparations for dressing leather and leather substitutes which are characterized by a combination of A. a solution of nitrocellulose and/or cellulose acetate butyrate in organic solvents, and B. a solution of a linear polyurethane resin in organic solvents, in the form of an aqueous emulsion, where the quantitative ratio of the solids of A:B is 1:0.1 to 1:10.

More particularly, the present invention relates to a composition for dressing leather and leather substitutes comprising an aqueous emulsion of organic solvent solutions of (A) a substituted cellulose selected from the group consisting of nitrocellulose having a D.S. of 1.9 to 2.4, cellulose acetate butyrate having a D.S. of 2.0 to 2.8 with a ratio of acetyl to butyryl groups of 1:1 to 4:1, and mixtures thereof, and (B) a linear polyurethane resin having a molecular weight range of from 10,000 to 500,000, in a weight ratio of A:B of 1:0.1 to 1:10, where the weight ratio of organic solvents to water is from 6:1 to 1:1.

Preferably, the composition for dressing leather and leather substitutes of the invention is prepared by starting from an aqueous solution of nitrocellulose and/or cellulose acetate butyrate in organic solvents and mix the latter with a solution of polyurethane resin in organic solvents so that an additional emulsion of the polyurethane resin solution in the aqueous emulsion of the nitrocellulose solution is produced. However, the nitrocellulose and/or cellulose acetate butyrate solution can first be mixed with the polyurethane resin solution and the mixture can then be emulsified in water.

For the preparation of the nitrocellulose solution (A), commercial nitrocellulose is employed, which is prepared in known manner by nitrating cellulose and which is sold for safety reason in moist form. For moistening can be used water, n-butanol and isopropanol. Preferably the nitrocellulose is a lacquer or film grade nitrocellulose having a degree of substitution (D.S.) of from 1.9 to 2.4. If a cellulose acetate butyrate is employed, it is preferably a lacquer grade material having a D.S. of from 1.9 to 2.4 with a ratio of acetyl to butyryl groups of 1:1 to 4:1.

Suitable solvents for the nitrocellulose and/or cellulose acetate butyrate are organic solvents in which the nitrocellulose and/or the cellulose acetate butyrate are sufficiently soluble or mixtures of the same with solvents which do not precipitate them. The organic solvents should not be water-miscible and must have a sufficient volatility at drying temperatures of 80° to 160° C to permit proper drying of the treated leather.

Examples of suitable organic solvents are ketones such as the lower alkanones, for example, methylethyl ketone, ethylamyl ketone, methylisobutyl ketone, diisobutyl ketone; cyclohexanone; lower alkylated cyclohexanones and lower alkylated cyclohexanones, for example, isophorone (3,5,5-trimethyl-2-cyclohexene-1-one) or trimethyl cyclohexanone; also esters, such as lower alkyl lower alkanoates, for example, ethyl acetate, butyl acetate, amyl acetate; lower alkoxyalkyl lower alkanoates, for example, ethyl glycol acetate (ethoxyethyl acetate) or butyl glycol acetate (butoxyethyl acetate), or aromatic hydrocarbons having 7 to 10 carbon atoms, such as toluene or xylene. The solvents are preferably used in admixture. The solutions contain about 2 to 20% by weight nitrocellulose and/or cellulose acetate butyrate.

The nitrocellulose and/or cellulose acetate butyrate solution can contain from 0 to 140% by weight of a plasticizer, based on the dry weight of substituted cellulose, for example, dialkyl phthalates, such as dimethyl phthalate, diethyl phthalate, dibutyl phthalate, diamyl phthalate, dioctyl phthalate or dinonyl phthalate, or dialkyl alkanedioates having from 14 to 26 carbon atoms, for example, the butyl, amyl, or octyl esters of sebacic acid or adipic acid, as well as blown or pressed castor oil. The solutions can also contain varnish resins compatible with nitrocellulose, such as alkyd resins, urea-formaldehyde or melamineformaldehyde resins, modified phenol-formaldehyde resins, ketone resins, and vinyl chloride copolymers.

The substituted cellulose solutions, furthermore, contain an emulsifier, which is preferably of a nonionic type, such as ethoxylated products of higher alkanols with 10 to 22 carbon atoms, or alkyl phenols having from 6 to 10 carbon atoms in the alkyl, such as nonyl phenol, with from 4 to 20 mols of ethylene oxide. Preferably, ethoxylated castor oils are used which have a degree of ethoxylation of 20 to 60 mols of ethylene oxide per mol of castor oil.

In special cases a combination of a wetting agent and an emulsifier can be used, where the emulsifier is an ethoxylated castor oil, while the wetting agent is preferably an amphoteric surface-active compound and is, for example, a betaine substituted with 1 to 2 higher alkyl radicals with 8 to 22 carbon atoms or a corresponding phosphatobetaine. The presence of the betaines causes the formation of a relatively coarse-particled emulsion of good stability, which has a great filling power on leather.

The amount of emulsifier added to the substituted cellulose solution is from 10 to 60% by weight, based on the dry weight of substituted cellulose and, optionally, an additional 2 to 6% by weight of wetting agent can be added.

Cellulose acetate butyrate, if necessary, in combination with nitrocellulose, can be used in the same manner in place of nitrocellulose.

Component (B) is a linear polyurethane resin dissolved in organic solvents. The linear polyurethane resins are produced by a polyaddition reaction from a polyester containing hydroxyl group with a diisocyanate and subsequent chain extension with amines or polyvalent alcohols. The polyesters employed are particularly the reaction products of glycols or alkanediols having from 2 to 18 carbon atoms with dibasic carboxylic acids or alkanedioic acids having from 4 to 10 carbon atoms, for example, propane diol or 1,4-butanediol with adipic acid. The proportions of reactants are chosen so that the glycol is in excess to give a polyester containing at least one hydroxyl group. The excess should be less than twofold, however. The diisocyanates are preferably alkylene diisocyanates having from 4 to 18 carbon atoms, such as hexamethylene diisocyanate, aromatic hydrocarbon diisocyanates having from 8 to 18 carbon atoms, such as phenylene diisocyanate, and particularly diphenylmethane-4,4'-diisocyanate. The diisocyanates are employed in substantially equimolar amounts with respect to the hydroxyl groups. The chain extension is preferably effected with glycols, particularly lower alkanediols, such as 1,4-butanediol or neopentyl glycol. Methods for the preparation of these resins are described, for example, in German Patent 831,604 or in Houben Weyl: "Methoden der Organischen Chemie," Vol. XIV/2, "Makromolekular Stoff," chapter on gumelastic materials, pages 79–88. The linear polyurethane resins are commercially available as pellets or as solutions with a content of 50 to 80% by weight of organic solvents. Preferably the same solvents are used as in the preparations of the substituted cellulose solutions.

The polyurethane solution can contain in special cases from 0.1 to 2% by weight of wetting agents. Preferably, the same wetting agents with amphoteric character are used as in the preparation of the substituted cellulose solutions.

Both to the substituted cellulose solutions and to the linear polyurethane resin solutions can be added coloring pigments or dyes, as well as fillers, like silica. The incorporation is effected by means of conventional dispersing apparatus, like three-roll mills, ball mills, etc. The amount incorporated is from 0 to 100% by weight based on the weight of the dry substituted cellulose or polyurethane resin.

Pigment preparations in the form of so-called color chips are also commercially available which contain organic or inorganic pigments in addition to a resin component, such as nitrocellulose, cellulose acetate butyrate or a vinyl chloride copolymer and, optionally, plasticizers.

In the production of the dressings according to the invention, the nitrocellulose and/or cellulose acetate butyrate solution (A) is preferably emulsified first in water, and the polyurethane solution (B) is emulsified additionally into this emulsified solution. The quantitative ratio of nitrocellulose and/or cellulose acetate butyrate to polyurethane resin on a dry weight basis is from 1:0.1 to 1:10, preferably from 1:3 to 1:5, while the ratio of organic solvents to water is from 6:1 to 1:1.

A corresponding result can be obtained by combining at first the two solutions (A) and (B), optionally, together with the required auxiliary substances, like plasticizers, varnish resins, dyes, pigments, emulsifiers and wetting agents, dissolved in a solvent mixture, thus preparing from the beginning a mixture of the solutions (A) and (B), which is then emulsified with water in the above-indicated manner.

The organic solutions are emulsified in known manner by distributing the organic phase in the aqueous phase by the application of strong shearing forces. It may be advisable to use stabilizers in the aqueous phase, for example, casein, methyl cellulose or carboxymethyl cellulose or gelatin. The emulsions prepared in the above-described manner are very stable and do not separate, even on prolonged storage or in use.

The preparations according to the invention are used for dressing fully tanned leathers or leather substitutes, such as imitation leathers, based on polyurethane or polyvinyl chloride. The leathers can be dyed or base coated in known manner with pigment-containing polymer dispersions, such as those based on polyacrylic acid, polymethacrylic acid and their esters, as well as acrylonitrile/butadiene copolymers. Pigmented preparations can also be used directly, however, on uncoated leather by applying a colorless nitrocellulose/polyurethane resin emulsion additionally as a top coat. Such a dressing is appealing by its extreme fastness and natural appearance of the grain, as well as by the simplicity of the application.

The application of the preparations according to the invention is simple and is so effected that the emulsion is first diluted with water in a ratio of 1:0.5 to 1:1 and sprayed on the leather, for example, with a spray gun.

The amount applied, based on the solid material, is 10 gm to 35 gm, preferably 20gm, for each square meter of leather surface. Depending on the type of leather and its preliminary treatment, larger or smaller amounts may be necessary to obtain a good result. After the application, the leather is dried at 80° to 160° C.

The following examples are illustrative of the practice of the invention without being limitative.

EXAMPLES

Preparation of Nitrocellulose Solutions and Emulsions

EXAMPLE 1

10.6 parts by weight of a nitrocellulose moistened with n-butanol (viscosity stage according to the falling ball method 1.2 - 2 seconds, 6.9 parts dry lacquertype nitrocellulose, 3.7 parts of n-butanol) were stirred with 32.6 parts by weight of ethyl amyl ketone, 11.0 parts by weight of trimethylcyclohexanone, 7.0 parts by weight of xylene, 6.0 parts by weight of isophorone and 2.8 parts by weight of an ethoxylated castor oil (30 mols of ethylene oxide) until a clear solution was formed.

70.0 parts by weight of this lacquer phase was emulsified in 30.0 parts by weight of water, using a highspeed stirrer.

EXAMPLE 2

10.6 parts by weight of a nitrocellulose moistened with water (viscosity stage according to the falling ball method 3–4 seconds, 6.9 parts of dry lacquer-type nitrocellulose and 3.7 parts of water) were mixed with 30.0 parts by weight of ethyl amyl ketone, 9.5 parts by weight of trimethyl cyclohexanone, 6.0 parts by weight of isophorone, 6.0 parts by weight of xylene, and 2.9 parts by weight of an ethoxylated castor oil (30 mols of ethylene oxide) and stirred until a clear solution was obtained.

65.0 parts by weight of this lacquer phase were emulsified with a high-speed stirrer in 35.0 parts by weight of water.

EXAMPLE 3

10.0 parts by weight of a nitrocellulose moistened with n-butanol (viscosity stage according to the falling ball method, 1.5 - 2 seconds, 6.5 parts of dry lacquer-type nitrocellulose and 3.5 parts of n-butanol) were stirred with 29.7 parts by weight of ethyl amyl ketone, 10.1 parts by weight of isophorone, 6.5 parts by weight of xylene, 5.7 parts by weight of butoxyethyl acetate, 5.3 parts by weight of dioctyl phthalate and 2.7 parts by weight of an ethoxylated castor oil (30 mols of ethylene oxide) until a clear solution was obtained.

70.0 parts by weight of this lacquer phase were emulsified in 30.0 parts by weight of water, using a high-speed stirrer.

Preparation of a Polyurethane Resin Solution

EXAMPLE 4 a. 20.0 parts by weight of a granulated linear polyurethane resin, prepared by polyaddition of diphenylmethane-4,4'-diisocyanate and the esterification product of 1,4-butanediol and adipic acid, where the chain extension was effected with neopentyl glycol, (molar weight 60,000 - 100,000, elongation 400%, tensile strength 350 $Kp/cm^2$) and b. 5.0 parts by weight of a granulated linear polyurethane resin prepared by polyaddition of the above-indicated components, where the chain extension was effected with 1,4-butanediol, (molar weight 60,000 - 100,000, elongation 700%, tensile strength 350 $Kp/cm^2$), were dissolved with 50.0 parts by weight of ethoxyethyl acetate, 12.5 parts by weight of cyclohexanone, and 12.5 parts by weight of xylene at 40° to 60° C with stirring.

Preparations of Combined Nitrocellulose/polyurethane Resin Solutions and Emulsions

EXAMPLE 5

6.5 parts by weight of a commercial pigment preparation from 3.55 parts by weight of a lacquer-type nitrocellulose, 1.75 parts by weight of plasticizer and 1.2 parts by weight of carbon black were stirred with 13.5 parts by weight of ethyl amyl ketone, 3.5 parts by weight of isophorone, 3.5 parts by weight of xylene, 2.5 parts by weight of trimethyl cyclohexanone, 20 parts by weight of cyclohexanone and 1.5 parts by weight of an ethoxylated castor oil (25 mols ethylene oxide) until a homogeneous solution was formed.

33.0 parts by weight of this colored lacquer phase were thoroughly mixed with 50.0 parts by weight of the polyurethane resin solution according to Example 4 and emulsified in 17.0 parts by weight of water by means of a high-speed stirrer.

EXAMPLE 6

10.6 parts by weight of a nitrocellulose moistened with n-butanol (viscosity stage, 1.5 - 2 seconds, 6.9 parts of dry, lacquer-type nitrocellulose and 3.7 parts of n-butanol) were stirred with 50.0 parts by weight of ethoxyethyl acetate, 32.6 parts by weight of ethyl amyl ketone, 19.5 parts by weight of xylene, 12.5 parts by weight of cyclohexanone, 11.0 parts by weight of trimethyl-cyclohexanone, and 6.0 parts by weight of isophorone until a clear solution was formed.

In 142.2 parts by weight of this nitrocellulose solution were dissolved under stirring 20.0 parts by weight of a granulated linear polyurethane resin (corresponding to Example 4(a)) and 5.0 parts by weight of a granulated linear polyurethane resin (corresponding to Example 4(b)) at 40° C to 50° C. After the dissolution process was completed, 2.8 parts by weight of an ethoxylated castor oil (25 mols of ethylene oxide) were added to the solution under stirring.

83 parts by weight of this lacquer phase were emulsified in 17 parts by weight of water by means of a high-speed stirrer.

Application to Leather or Leather Substitutes

EXAMPLE 7

100 parts of the nitrocellulose lacquer emulsion produced according to Example 1 were combined with 100 parts of the polyurethane resin solution produced according to Example 4 in such a fashion that the polyurethane resin solution was emulsified into the nitrocellulose resin emulsion under strong agitation.

The emulsion obtained was diluted with water in a ratio of 1:0.5 and sprayed (25 gm solid/$m^2$) on a fully grained, previously dyed and bottomed leather and dried. The treated leather showed excellent physical fastness properties and a good grain pattern. The following fastness values were determined:

Fastness to dry rubbing according to Veslic — 5,000

Fastness to wet rubbing according to Veslic — 1,000
Bally flexometer dry — 100,000 bends
Bally flexometer wet — 50,000 bends
Bally flexometer −10° C — 10,000 bends
Cold breaking strength — −20° C

EXAMPLE 8

An entirely finish-tanned, fully grained leather was sprayed with a pigment mixture of 50 parts of nitrocellulose/polyurethane emulsion according to Example 5, 50 parts of nitrocellulose/polyurethane resin emulsion according to Example 7, and 50 parts of water, which was then dried and pressed. Finally, a colorless mixture of 100 parts of nitrocellulose/polyurethane resin emulsion according to Example 7 and 50 parts of water was sprayed on. The leather thus obtained had the following physical fastness properties:

Fastness to dry rubbing according to Veslic — 5,000
Fastness to wet rubbing according to Veslic — 5,000
Bally flexometer dry — 100,000 bends
Bally flexometer wet — 50,000 bends
Bally flexometer −10° C — 10,000 bends
Cold breaking strength — −20° C For comparison, a conventional dressing was applied on the same leather, using merely a nitrocellulose emulsion according to Example 3. The following fastness values were obtained:

Fastness to dry rubbing according to Veslic — 2,000
Fastness to wet rubbing according to Veslic — 50/100
Bally flexometer dry — 100,000 bends
Bally flexometer wet — 40,000 bends
Bally flexometer −10° C — 10,000 bends
Cold breaking strength — −5° to −10° C After 100 wet rubbings, the dressing was already considerably abraded.

EXAMPLE 9

On a predyed, fully grained cowhide previously bottomed with a polymethacrylic acid dispersion was applied an emulsion prepared from 100 parts of nitrocellulose lacquer emulsion according to Example 2 and 100 parts of polyurethane resin solution prepared according to Example 4.

The emulsion was diluted with water in a ratio of 1:0.5 and sprayed on the grain side of the leather in the manner described in Example 7. A leather was obtained with excellent fastness properties and a natural feel. The physical fastness values corresponded to those of Example 7.

EXAMPLE 10

6.9 parts by weight of a lacquer-type cellulose acetate butyrate of the viscosity stage 4 to 6 seconds were stirred with 30.0 parts by weight of ethyl amyl ketone, 10.0 parts by weight of trimethyl-cyclohexanone, 6.2 parts by weight of cyclohexanone, 7.0 parts by weight of isophorone, 7.0 parts by weight of xylene, and 2.9 parts by weight of an ethoxylated castor oil (35 mols ethylene oxide), until a homogeneous solution was formed.

70.0 parts by weight of this lacquer phase were emulsified in 30.0 parts by weight of water by means of a high-speed stirrer.

100 parts of this cellulose acetate butyrate emulsion and 100 parts polyurethane solution according to Example 4 were mixed in the manner described in Example 7. The emulsion obtained was diluted with water in a ratio of 1:0.5 and applied to leather and tested in the manner described in Example 7. Comparable results were obtained.

EXAMPLE 11

A mixture of 100 parts of nitrocellulose/polyurethane resin emulsion according to Example 6 and 50 parts of water was sprayed on a normal polyurethane imitation leather or polyvinyl chloride imitation leather respectively. The treated imitation leathers had a very soft and leatherlike feel.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A composition for dressing leather and leather substitutes comprising an aqueous emulsion of organic solvent solutions of (A) a substituted cellulose selected from the group consisting of nitrocellulose having a D.S. of 1.9 to 2.4, cellulose acetate butyrate having a D.S. of 2.0 to 2.8 with a ratio of acetyl to butyryl groups of 1:1 to 4:1, and mixtures thereof, and (B) a linear polyurethane resin having a molecular weight range of from 10,000 to 500,000, in a weight ratio of A:B of 1:0.1 to 1:10, where the weight ratio of organic solvents to water is from 6:1 to 1:1, said aqueous emulsion containing from 10% to 60% by weight, based on the dry weight of said substituted cellulose of a non-ionic surface-active compound as an emulsifier and said organic solvents being water-immiscible and volatile in the temperature range of 80° to 160° C.

2. The composition of claim 1 wherein said water-immiscible, volatile organic solvents are selected from the group consisting of ketones, esters and aromatic hydrocarbons.

3. The composition of claim 1 wherein said weight ratio of A:B is from 1:3 to 1:5.

4. The composition of claim 1 wherein said organic solvent solution of a substituted cellulose contains from 2 to 20% by weight of said substituted cellulose.

5. The composition of claim 1 wherein said substituted cellulose solutions contain from 0% to 140% by weight of a plasticizer, based on the dry weight of the substituted cellulose.

6. The composition of claim 1 wherein said non-ionic surface-active compound is selected from the group consisting of ethoxylated adducts of alkanols having from 10 to 22 carbon atoms, and alkylphenols having from 6 to 16 carbon atoms in the alkyl, ethoxylated with from 4 to 20 mols of ethylene oxide and castor oil ethoxylated with from 20 to 60 mols of ethylene oxide.

7. The composition of claim 1 wherein said substituted cellulose is said nitrocellulose.

8. The composition of claim 1 wherein said substituted cellulose is said cellulose acetate butyrate.

9. The composition of claim 1 wherein said substituted cellulose is a mixture of said nitrocellulose and said cellulose acetate butyrate.

10. The composition of claim 1 wherein said organic solvent solution of a linear polyurethane resin contains from 20 to 50% by weight of said linear polyurethane resin.

11. The composition of claim 1 wherein said linear polyurethane resin is prepared by a polyaddition reaction of a hydroxyl group-containing polyester with a diisocyanate in a substantially equimolar amount with respect to the hydroxyl groups in said polyester and subsequent chain extension with an extender selected from the group consisting of lower alkylamines and lower alkanediols.

12. A leather or leather substitute dressed with from 10 gm to 35 gm dry weight per square meter of the composition for dressing leather and leather substitutes of claim 1.

* * * * *